United States Patent [19]
Hitchcock

[11] 3,840,844
[45] Oct. 8, 1974

[54] ELECTRON-BEAM ANALOG COMPUTER FOR DETERMINING COORDINATES OF A SEAFLOOR POINT

[75] Inventor: Robert D. Hitchcock, Ventura, Calif.

[73] Assignee: The United States of America as represented by the Secretary of the Navy, Washington, D.C.

[22] Filed: Sept. 24, 1973

[21] Appl. No.: 400,087

[52] U.S. Cl. .................................. 340/3 R, 340/3 C
[51] Int. Cl. .......................... G01s 9/68, G01s 7/62
[58] Field of Search ............ 340/1 R, 3 R, 3 C, 6 R; 235/151.32

[56] References Cited
UNITED STATES PATENTS
| | | | |
|---|---|---|---|
| 3,168,733 | 2/1965 | Fryklund | 340/3 C X |
| 3,178,680 | 4/1965 | Jackson | 340/6 R |
| 3,800,272 | 3/1974 | Hitchcock et al. | 340/3 R |

Primary Examiner—Richard A. Farley
Attorney, Agent, or Firm—Richard S. Sciascia; Joseph M. St. Amand; David O'Reilly

[57] ABSTRACT

A device for determining coordinates of a seafloor point by acoustic triangulation which provides a real-time plan position indication read-out of the coordinates of a seafloor target, scanned by a pair of rotating, pulsed, side-looking sonar transducers, which are displaced from each other along a common vertical axis. The device utilizes an electron-beam method to compute, by analog triangulation, the cylindrical coordinates of a target relative to the axis of the rotating transducer pair. The system is comprised of a sonar transceiver, a dual gun cathode ray tube, and a vidicon tube which provides an output directly to a plan position indicator (PPI) display (i.e., without digital-to-analog conversion). The input signals to this analog computer are two voltage pulses, each pulse being displaced in time from a given reference pulse. These voltage pulses are two independently measured echo ranges from the two transducers to a target.

7 Claims, 8 Drawing Figures

PATENTED OCT 8 1974

OCEAN FLOOR

ELECTRON-BEAM ANALOG COMPUTER FOR DETERMINING COORDINATES OF A SEAFLOOR POINT

BACKGROUND OF THE INVENTION

This invention relates generally to systems for accurately positioning objects on the ocean floor, and more particularly relates to an analog computer for use with a positioning system which provides real-time read out of echo range measurement of seafloor coordinates in a fixed reference frame.

The system described herein is particularly adapted for use with the rotating acoustic scanner system for positioning objects on the ocean floor, described in application Ser. No. 279,134, filed on Aug. 8, 1972, now U.S. Pat. No. 3,800,272. The above referenced application describes a system concept for positioning objects onto the seafloor with high precision relative to an array of seafloor benchmarks consisting of artificial sonar targets and/or natural bottom features. A subsystem of the invention described in the referenced application is a device to determine the coordinates of a given target in a fixed reference frame, namely a cylindrical coordinate system $(r,\phi,z)$ having the $z$-axis coincident with the axis of rotation of a pair of side-looking sonar transducers. The subsystem described in the reference application utilizes conventional computer electronics to take the two independently measured echo ranges from the two vertically displaced transducers to a given sonar target, operate mathematically on these two measurements and come up with the $r$–$z$ coordinates of the target relative to the axis of position.

A basic problem with the rotating scanner system is the fact that the elevation angle of each side-looking transducer is relatively wide, typically on the order of 60°. This is why triangulation is necessary to get the values of $r$ and $z$. The reason we want to know $r$ and $z$ is so that we can construct a true-position plan-position-indicator (PPI) plot. The PPI plot, generated by a single rotating transducer, would give only the transducer-to-target range (plus the azimuth coordinate, $\phi$) and, in the general situation with the elevation of the seafloor varying from point to point in an unknown manner, we cannot use a range-PPI plot to position our scanner system relative to the target array.

The triangulation process is only possible if we can identify a given target in each of the two range-PPI plots, one for each transducer. In stereo photography, target identification is easy because optical resolution is so great. But, in a pair of side-looking sonar records, it may not always be possible to pick out a given target in each member of the pair because of such reasons as low target reflectivity, presence of natural targets with the same reflectivity as the looked-for artificial target, and the fact that range measurement systems, like sonar and radar, produce target images which do not always look like their optical counterparts.

Even when target identification, in each of the members of a sonar record pair, can be done by a human observer, it may not be possible to do the same thing with a machine. But when target identification is possible without human assistance, for example, in the case where each azimuth sector of the scanned seafloor area has only one target generating a prominent, easily detected return pulse, we still have the problem of determining instantly (i.e., in real-time) the magnitude of $r$ and $z$. The straightforward way of obtaining $r$ and $z$ from two echo ranges is, of course, to use the equations given below and a rapid state-of-the-art method to perform the calculations with a small digital computer such as any one of several brands of electronic desk calculators which have storage capacity and are programmable.

A typical state-of-the-art electronic desk calculator needed to compute $r$ and $z$ from the two echo ranges contains fairly complex digital circuitry and is relatively expensive. Also, such a calculator, in general, has much greater storage capacity and program capability than is required to compute these values. Thus, a basic custom-made digital computer could only handle these computations and the two echo range inputs provided on each change of $\phi$, at a relatively high cost, which cost would cover a four digit capability (assuming a maximum range of less than 500 feet and a measuring precision of 0.1 ft.) and a Nixie tube readout. Also, the readout could not be obtained in less than 1 second after receipt of the two echo ranges.

What is needed is a computer which is relatively inexpensive and yields $r$ and $z$ in less than about 0.1 second. The 0.1 second readout is needed because we must have the true position PPI plot as quickly as possible to keep down the at-sea cost of operating our positioning system. A matter of seconds can seriously affect the cost of the load/positioning operation which may require a thruster and a one-point-moor system capable of being held stationary in the water for only as long as it takes to generate the 360° scan by the rotating transducer pair. Because of the number of seafloor targets which must be scanned in, and the relatively low value of the speed of sound in water (compared to the velocity of light which applies to a radar PPI), it may take as long as 30 seconds to scan through 360°. During this 30 seconds, the rotating scanner must be held as nearly motionless as possible — say, within an excursion circle of 1 foot radius. Before load touch-down can be executed, it may take several such 360° scans and position-holding operations to match up the true position PPI plot with the reference PPI plot constructed at the time the target array was established (the rotating scanner system having been placed on the bottom for this scanning operation).

A state-of-the-art digital computer which would read out $r$ and $z$ in less than 0.1 second from receipt of the two echo ranges would cost even more than the small electronic desk calculator type of computer. And, we would still need a digital-to-analog conversion device for taking the readout from this computer and constructing a PPI plot (which is an analog display). Also, we would need an analog-to-digital device to transfer signals from the sonar receiver to the digital computer unless the sonar receiver, itself, were a digital device such as a counter initiated at the time the transducers were pulsed; a counter type sonar receiver could read digital information directly to the digital computer but this type of sonar transceiver is more costly than conventional analog receivers.

SUMMARY OF THE INVENTION

The present invention solves the problems described above by providing a real-time PPI readout of the coordinates of a seafloor target without the necessity of a digital-to-analog conversion. The system is basically an electron-beam analog computer which will connect directly to a PPI shipboard display. The input signals to this analog computer are two voltage pulses, each pulse being displaced in time from a given reference pulse, generated by a pair of return signals from a given seafloor target. The two major components of the invention are a dual gun cathode ray tube (CRT) and a vidicon tube. The voltage pulses generated by the pair of return signals from a given seafloor target are applied to the CRT which increases the beam intensity to a point high enough to produce a visible trace on the CRT screen. The CRT is scanned by the vidicon tube which produces an output to the PPI display only at the instant the vidicon electron beam impinges on the spot produced by the voltage pulses applied to the CRT. Circuitry connecting the output from the vidicon tube to a pen recorder produces a real-time PPI plot from these values.

OBJECTS OF THE INVENTION

It is one object of the present invention to provide a computer which gives real-time readout of echo range measurement of seafloor coordinates in a fixed reference frame.

Yet another object of the present invention is to provide a computer to give coordinates of a seafloor target by analog triangulation.

Still another object of the present invention is to provide a computer which gives coordinates of a seafloor target at relatively low cost.

Yet still another object of the present invention is to provide a computer which gives coordinates of a seafloor target without the necessity of a digital-to-analog conversion.

Another object of the present invention is to provide a computer which gives the coordinates of a seafloor target by utilizing an electron-beam method.

Yet another object of the present invention is to provide a computer which gives the coordinates of a seafloor target in considerably less than one second.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1A:
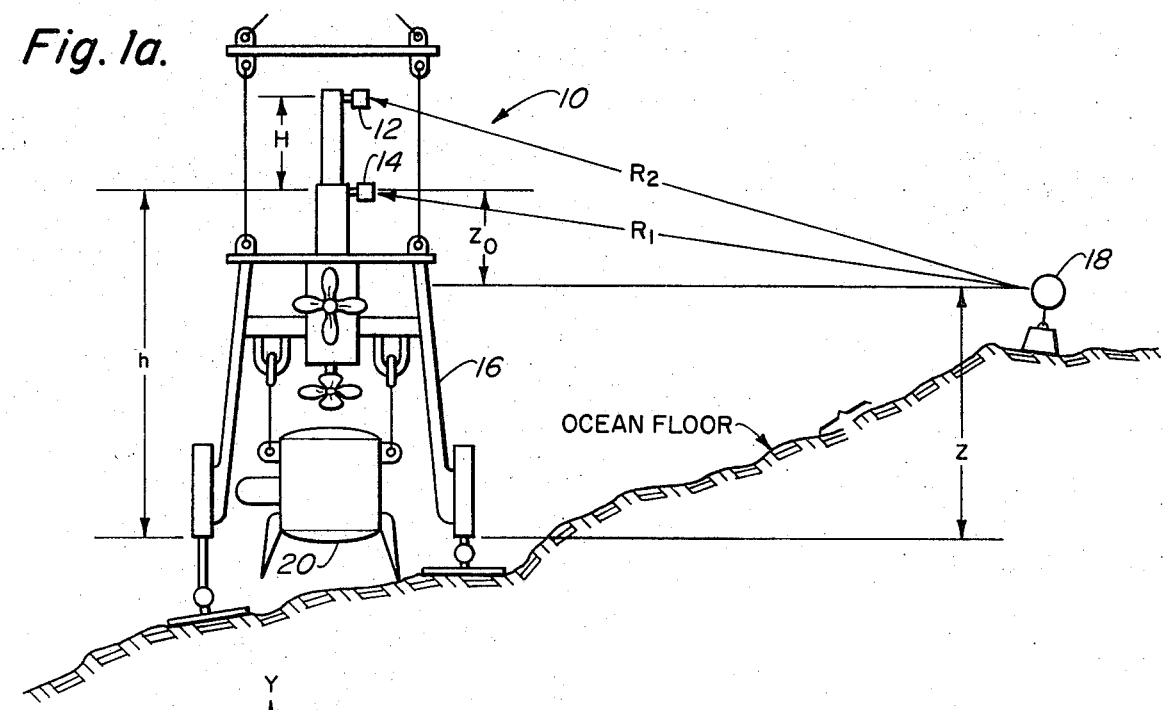
FIGS. 1a and 1b illustrate the rotating acoustic scanner positioning system in somewhat schematic form showing the geometry for the acoustic triangulation process.
Figure 1B:
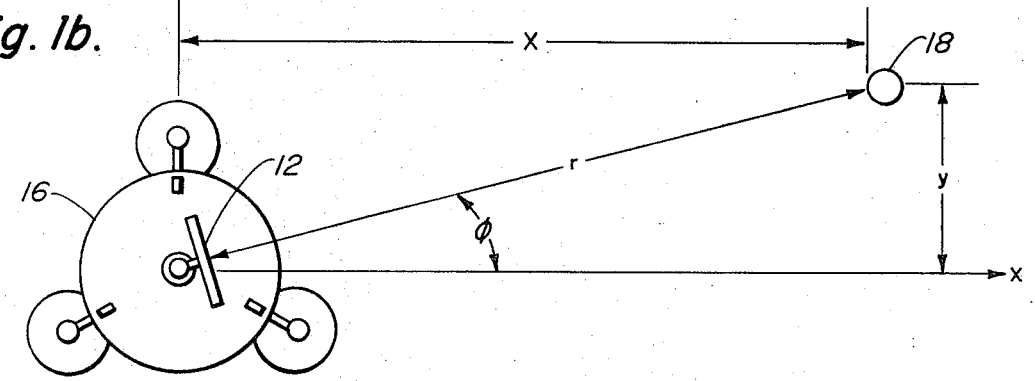

The geometry of this acoustic-triangulation process is shown in FIG. 1. There is indicated generally a rotating acoustic scanner system 10 having a pair of rotating sidelooking sonar transducers 12 and 14, mounted one above the other on a supporting structure 16, positioned on the ocean floor. A sonar target being scanned is shown at 18. The mathematical equations for computing $r$ and $z$ from the two echo ranges, $R_1$ and $R_2$, are straightforward and are given below:

$$z_0 = [(R_2^2 - R_1^2)/2H - (H/2)] \qquad (1)$$

$$z = h - z_0 \qquad (2)$$

$$r = [R_1^2 - z_0^2]^{1/2} \qquad (3)$$

$h$ = height of lower transducer above reference point on axis of rotation

The $\phi$ coordinate is measured directly since the acoustic beam of each transducer is very narrow in azimuth (typically around 1°). The parameter, $z$, is a better representation of the target elevation than $z_0$ because the heights of both transducers are variable. The load being positioned relative to sonar targets (e.g., nuclear powered ASW hydrophones) is shown at 20. The computer to be used in conjunction with the rotating acoustic scanner system (RASS) 10, shown in FIG. 1, is basically an electron-beam analog computer which will connect directly to a PPI shipboard display (i.e., without digital-to-analog conversion) is shown in block diagram form in FIG. 2. The side-looking sonar transducers 12, 14 are pulsed respectively at frequencies $f_1$ and $f_2$. Sonar transceiver 22 provides input signals to the analog computer in the form of two voltage pulses, each pulse being displaced in time from a given reference pulse. The two voltage pulses are generated by the pair of return signals to the transducers 12 and 14 from the seafloor sonar target 18. The time displacement of either of these pulses is given by:

$$t_j = 2R_j/C \qquad (4)$$

where $j = 1, 2$
and C = velocity of sound in water.

The input to this analog computer must be two prominent voltage pulses, which means that each elemental azimuth sector of the scanned target array must contain only a single sonar target having an acoustic reflectivity considerably greater than the bottom area included in the azimuth sector.

Figure 2A:
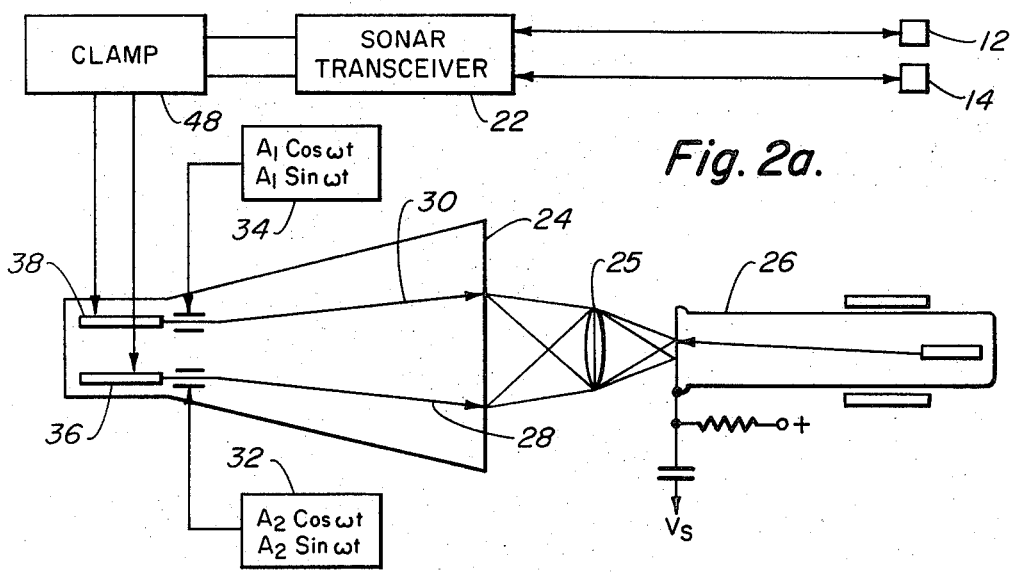
FIG. 2a is a block diagram of the electron-beam analog computer for generating true-position PPI plot.

The electron-beam analog computer for generating trueposition PPI plot, shown in the block diagram of FIG. 2, has two major components comprised of a dual gun cathode ray tube (CRT) 24, and a vidicon tube 26. A dual gun, 10-inch CRT 24 with approximately a 0.005-inch resolution and the vidicon tube 26 with approximately a 1,000 line resolution are suitable. This CRT would be suitable for measuring sonar range to approximately 500 feet with about a 0.5 foot precision.

Figure 2B:
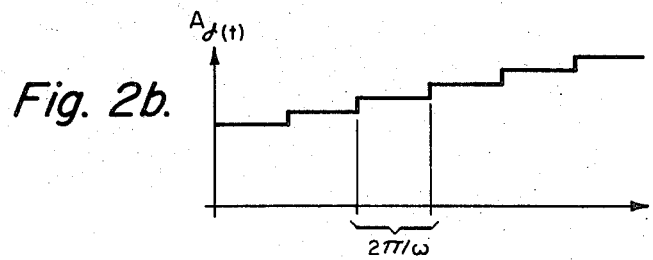
FIG. 2b is a plot of a star-step function for generating the stepped spiral scans.

Each electron beam 28, 30, in the CRT 24, describes a stepped-spiral scan on the face of the tube. Each scan is initiated in a conventional manner at the instant the sonar transceiver 22 pulses the sonar transducer pair 12 and 14. The circuitry for generating the stepped-spiral scans is also conventional in that each electron beam is controlled by a pair of electric fields at 90° to each other. The electric fields are generated by circuits 32 and 34, one field given by:

$$E_{j1} = A_j(t) \sin \omega t \quad (5)$$

and the other field given by:

$$E_{j2} = A_j(t) \cos \omega t \quad (6)$$

where $A_j(t)$ is a stair-step function, plotted in FIG. 2b, with a period shown equal to $2\pi/\omega$ and $j$ is equal to 1 for the lower electron gun and $j$ equals 2 for the upper electron gun.

Figure 3:
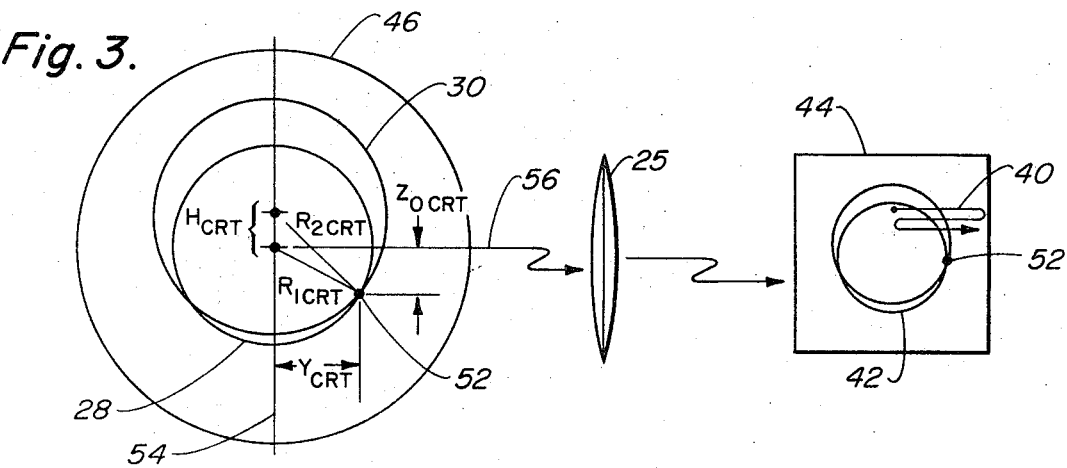
FIG. 3 illustrates the computational process of the electron-beam analog computer.

The basic operation of this invention is shown in FIG. 3. The centers of the two electron-beam scans 28, 30 are spaced vertically a distance shown as $H_{CRT}$, which is directly proportional to the H shown in FIG. 1, the actual transducer separation. The voltage pulses generated by the return signals to transducers 12 and 14 (which measure $R_1$ and $R_2$) are applied to the gate electrodes of electron guns 36 and 38, respectively. When no pulses are being applied to electron guns 36 and 38, the intensity of the electron beam is too low to produce a spot on the CRT face 46. When the transducer pulses are applied to the electron guns 36 and 38, the beam intensity increases beyond a predetermined threshold, producing a visible trace on the CRT face 46. At the same time, the magnitude of the voltages generating the stepped-spiral scans is held constant at whatever value they reach at the time the voltage pulses open the gate of the electron guns 36 and 38, respectively. The magnitude of the stepped-spiral scanned voltages remains constant for a sufficient number of $2\pi/\omega$ periods to allow the vidicon tube 26 scanning electron beam 40 to monitor the CRT image 42 on the vidicon tube target 44, produced by the stepped-spiral scans 28 and 30 on the CRT face 46. The CRT image 42 is focussed on the vidicon tube target 44 by lens 25. The stepped-spiral scans 28 and 30 are two intersecting circles of radii $R_{1CRT}$ and $R_{2CRT}$, respectively. The technique of holding the two stepped-spiral scanning voltages contant is within the state-of-the-art and involves a simple clamping circuit. The value of $\omega$ is set such that $2\pi/\omega$ is equal to the time required for sound to move through 0.5 foot of water and return, i.e., 0.2 millisecond. Thus, $\omega$ would be about $3 \times 10^4$ radians/second, and the frequency of the CW voltages for generating the spiral scan would be about 5 kHz.

Figure 6:
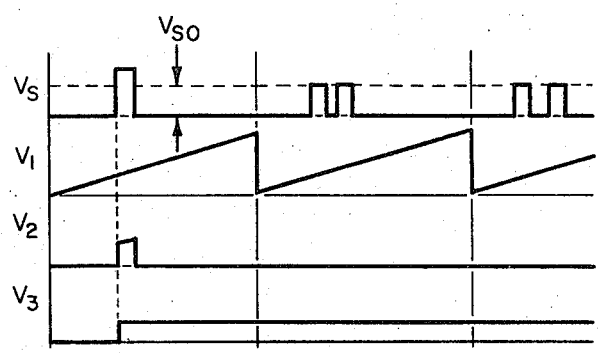
FIG. 6 is a waveform diagram showing the time relationship of various voltages and the readout electronics.

For a certain time interval following the time of arrival of each of the return pulses from the sonar reflector, a pair of intersecting circles appears on the face 46 of the CRT tube 24. By means of a conventional clamping circuit 48, between the sonar transceiver 22 and the CRT tube 24, this time interval is made equal to approximately 1/30 second, which is the time required for the vidicon tube 26 to scan the CRT screen 46. The vidicon tube scanning electron beam 40 is a sawtooth raster, as shown by V1 of FIG. 6, and is adjusted to scan only the right-hand half of the CRT face 46.

Figure 5:
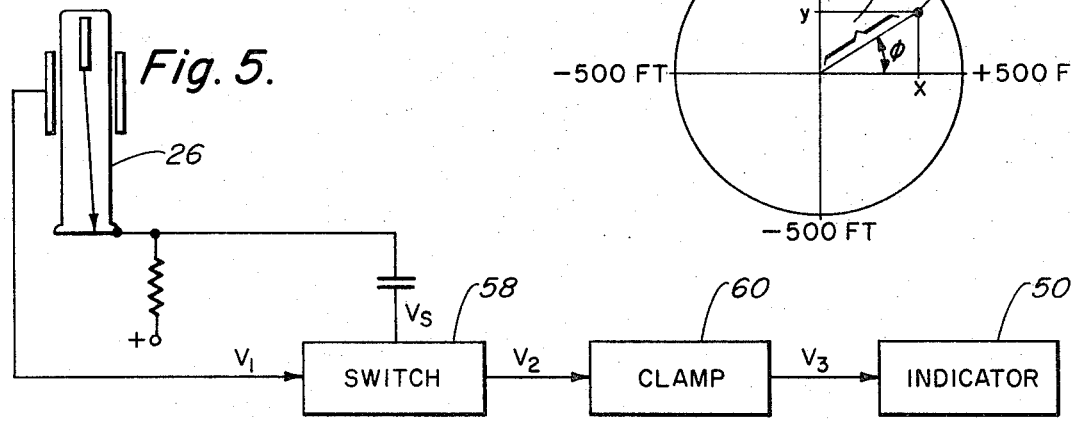
FIG. 5 is a block diagram of the readout electronics of the electron-beam analog computer.

FIG. 5 shows the circuitry for producing the PPI display from the output of the vidicon tube 26. The electronic circuitry which receives the output from the vidicon tube $V_s$ delivers an output signal $V_3$, to the PPI display device 50 at the instant the vidicon scanning electron beam 40 impinges on the intersection point 52 of the two circles 28, 30 on the CRT face 46. This point is a distance, $r_{CRT}$, from the vertical axis 54 of the CRT face 46 and a distance, $z_{0(CRT)}$, from the horizontal axis 56. These distances, $r_{CRT}$ and $z_{0(CRT)}$, are in the same ratio to $r$ and $z_0$ as $H_{CRT}$ is to H.

The method of getting the PPI to read out, at the moment the vidicon scanning electron beam 40 is in contact with the point 52, is straightforward and utilizes switching circuitry as shown in FIG. 5. The output from the vidicon tube 26, $V_s$, is supplied to a switch 58 which turns on when $V_s$ is about 1.5 times the signal produced by scanning one CRT trace at a time. The switch 58 can be a single transistor circuit with $V_s$ applied to the base of the transistor and the vidicon horizontal-sweep voltage, $V_1$, applied to the collector. Following the transistor switch, a clamping circuit holds the output, $V_2$, of the switch 58 at the value reached by $V_1$ at the instant the switch 58 was turned on by $V_s$. The output, $V_3$, of the clamping circuit 60 is a step function, shown in FIG. 6, whose magnitude is equal to or proportional to $V_1$ at the turn-on time and whose duration is long enough to drive PPI display to position, $r_{PPI}$, from center, as shown in the illustration of the PPI display in FIG. 4. The distance, $r_{PPI}$, is, of course, proportional to the actual distance, $r$. The $z$ coordinate is measured in an identical manner by utilizing the vertical sweep voltage of the vidicon tube 26, but is not illustrated for the sake of clarity.

The clamping circuit 60 would be required only when indicator 50 is a pen recorder PPI. For a CRT type of PPI display, with photographic recording, the output, $V_2$, of the switch 58 could be directly applied to the gate of the PPI-CRT electron gun. During the time $V_s$ is applied to the switch 58, the electron beam of the PPI would generate a visible trace, which could readily be made no longer than the equivalent of 0.5 foot by proper adjustment of the sweep rate.

The voltage value which $V_s$ must have to turn on the transistor switch 58 depends upon the magnitude of the signal generated when the vidicon scanning electron beam 40 impinges on either one of the traced out circles 28, 30 on the CRT screen 46, illustrated in FIG. 3. At points on either of these two circles, 28, 30, outside the intersection point 52, $V_s$ will have some value, $V_{so}$. At the intersection point 52, $V_s$ will have a value of about 1.5 ($V_{so}$), since, in general, the vidicon signal is not linearly related to the CRT trace intensity and also because the light intensity will not be doubled at the intersection point.

Other more complicated techniques are available for turning on the transistor switch 58 when the intersection 52 of two circles is scanned. One such technique would utilize digital circuitry which would cause the transistor switch to remain off as long as two voltage pulses were generated by the vidicon tube 26 for every sweep. The switch would turn on only when a single voltage pulse was generated in a given sweep, which would occur when the intersection point 52 was swept. This particular technique, however, would not be as advantageous as the preferred embodiment because it may require enough extra circuitry to make it less economically feasible than a state-of-the-art digital computer.

Figure 4:
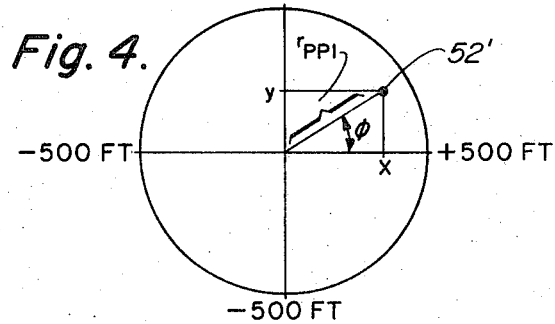
FIG. 4 illustrates the PPI display produced by the electron-beam analog computer.

The $z$ coordinate could be read out in digital form and, by means of video techniques, displayed adjacent to the corresponding target image in the PPI plot, shown in FIG. 4. However, this would require analog-to-digital conversion which is something the invention is trying to circumvent. However, for positioning by a rotating acoustic scanner, as described in the above referenced application, knowledge of the numerical value of either $z_0$ 125p3or $z$ is not absolutely necessary in matching true-position PPI plots. But, in using a digital computer to determine the $r$ coordinate of the seafloor target, the value of $z_0$ must be computed in the process (see Equations 1 and 3). This process requires extraction of a square root, which is one of the reasons an electronic desk calculator type of computer would take a considerably longer time to determine the value of the $r$ coordinate than would the electron-beam analog computer of this disclosure (one or more seconds compared to 1/30 second).

Thus, there has been disclosed an electron-beam analog computer which provides a real-time PPI readout of the coordinates of a seafloor target, which is considerably more economical than utilizing a digital computer with equivalent speed and is considerably easier to trouble shoot and repair.

Obviously, many modifications and variations of the present invention are possible in light of the above teachings. It is therefore to be understood that within the scope of the appended claims the invention may be practiced otherwise than as specifically described.

I claim:

1. A computing system for providing a direct readout of the coordinates of a seafloor target from echo ranges produced by a pair of rotating, pulsed, side-looking sonar transducers comprising:

a cathode ray tube having first and second electron guns;
   means for applying said first and second echo ranges to the first and second electron guns, respectively;

means for applying first and second electric fields to the electron beams produced by said first and second electron guns to generate a pair of intersecting, stepped-spiral scans having a predetermined vertical displacement;
   means for scanning the pair of stepped-spiral scans;

switching means adapted to be turned on when the scanning means impinges on the intersection of the stepped-spiral scans; and
   indicating means connected to the output of the switching means and adapted to display the output of the scanning means so that the coordinates of the seafloor target may be directly determined.

2. The computing system of claim 1 wherein the means for applying the first and second echo ranges to the cathode ray tube includes a clamping circuit having a predetermined time interval.

3. The computing system of claim 2 wherein the clamping circuit has a time interval of approximately 1/30 second.

4. The computing system of claim 3 wherein the scanning means comprises:
   a vidicon tube; and
   a lens for focussing the stepped-spiral scans on the vidicon tube target.

5. The computing system as recited in claim 4 wherein the indicating means is a pen recorder.

6. The computing system as recited in claim 5 including a clamping circuit connecting the switching means to the indicating means for holding the output of the switching means constant at the value reached at the instant the switching means was turned on.

7. The computing system of claim 4 wherein the indicating means is a plan position indicating cathode ray tube.

* * * * *